Jan. 4, 1927.  1,612,957
C. S. WATKINS
WHEEL AND DEMOUNTABLE RIM
Filed Jan. 15, 1923

WITNESSES                                    Inventor
                                    Clayton Stuart Watkins Patented Jan. 4, 1927.

1,612,957

UNITED STATES PATENT OFFICE.

CLAYTON STUART WATKINS, OF WICHITA FALLS, TEXAS.

WHEEL AND DEMOUNTABLE RIM.

Application filed January 15, 1923. Serial No. 612,723.

The object of this invention is to provide a wheel and demountable rim which is very strong and rigid, with means for removing or applying the rim by turning one gear approximately one full turn. Another object of this invention is to provide a device of this nature which is very simple and practical, and can be manufactured and sold at a very nominal cost.

The nature and advantages of the invention will be better understood when the following detailed description is read in connection with the accompanying drawing, forming a part of this application. The invention resides in the construction, combination and arrangement of parts as claimed.

In the accompanying drawing, the various parts will be referred to by numbers.

Figure 1:
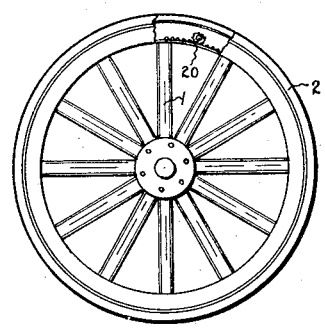
Figure 2:
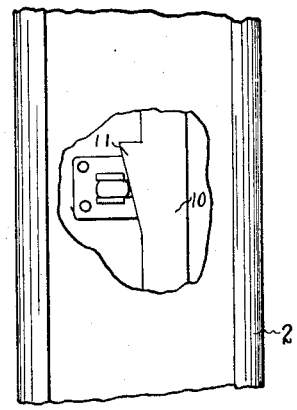
Figure 3:
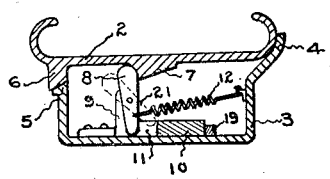
Figure 4:
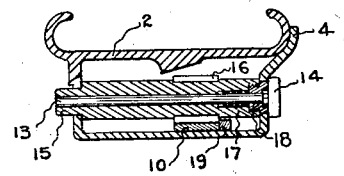
Figure 5:
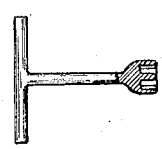

Figure 1 is a side view of the wheel and rim assembled. Figure 2 is a view showing the ring and lug arrangement. Figure 3 is a view showing the clamping lever. Figure 4 is a view showing the gear and shaft arrangement. Figure 5 is a view showing a special socket wrench used in connection with this invention.

The device forming the subject matter of this invention comprises a wheel 1 of any suitable design, a rim 2 of any suitable design, a felloe band 3 having a slanting flange 4 arranged thereon, as illustrated in Figure 3 of the accompanying drawing. A flange 5 is also arranged on the felloe band 3 at right angles thereto. A flange 6 is arranged on the rim 2 as illustrated in Figure 3. A plurality of lugs 7 are arranged on the rim 2. 8 is a clamping lever. 9 is a support for the clamping lever 8. 10 is a ring arranged in the felloe band 3 having a certain number of slanting lugs 11 arranged thereon as illustrated in Figure 2. 12 is a coil spring attached to the clamping lever 8 and anchored to the felloe band 3 for the purpose hereinafter described. 13 is a shaft. 14 is a head arranged on said shaft. 15 is a hollow gear shaft having a gear 16 arranged thereon forming a part thereof. 17 is a coil spring. 18 is a threaded bushing arranged in the hollow gear shaft 15, said threaded bushing 18 having a female gear arranged therein. A male gear is arranged on the head 14 for association with the female gear in the threaded bushing 18. 19 is a lug attached to the felloe band 3 for the purpose of holding the ring 10 securely in place. A plurality of teeth are arranged on the ring 10 for association with the gear 16. The outer end of the hollow gear shaft 15 is formed in a hexagon shape as illustrated at 20 in Figure 1. The head 14 is flat on one side and is designed to engage the flange 4 as shown in Figure 4, thereby preventing turning of said head and the spindle 13 when in such engaged position.

The device is operated in the following manner. When it is desired to remove the rim 2 from the wheel, the wrench as illustrated in Figure 5 is applied to the hexagon end of the hollow gear shaft 15. It will be noted that the above mentioned wrench has a spindle arranged therein. It will also be noted that when the wrench is applied to the gear shaft 15 the above mentioned spindle of said wrench will move the shaft 13 thus disengaging the male gear on the head 14 from the female gear in the threaded bushing 18 thus permitting the gear 16 to be turned. When the gear 16 is turned in a certain direction, thus moving the ring 10, the slanting lug 11 which is arranged on the ring 10 is disengaged from the clamping lever 8 thus permitting the spring 12 to draw the clamping lever 8 in the position as illustrated by the dotted line 21, thus permitting the rim 2 to be easily removed.

When it is desired to apply the rim 2, the same is placed over the felloe band 3. The gear 16 is then turned in the proper direction thus engaging the slanting lugs 11 with the clamping lever 8. It will be noted that the clamping lever 8 is thus pressed against the lug 7, which forces the rim 2 against the flange 4 and the flange 5. It will also be noted that when the above mentioned wrench is removed the coil spring 17 moves the shaft 13 in place as illustrated in Figure 4, thus engaging the male gear which is arranged on the head 14, with the female gear which is arranged in the threaded bushing 18, thus preventing the gear 16 from moving, and holding the entire assembly securely in place.

While it is believed from the foregoing description, the nature and advantages of the device will be readily apparent, I desire to have it understood that I do not limit myself to what is herein shown and described, and that such changes may be resorted to when desired as fall within the scope of what is herein claimed.

What I claim is:

1. In combination, a wheel provided with a plurality of bracket members having levers thereon, a peripheral band on said wheel and having cam faces adapted to impinge one end of said levers, means for rotating said peripheral band, a rim having an internal surface adapted to be engaged by the other end of said levers, and means for locking said band against said levers.

2. The combination described in claim 1, and in which said means for rotating said band include a mechanism for preventing the accidental rotative displacement of said band.

3. In a wheel having supporting means for a rim and provided with a peripheral band for locking such rim thereupon, means for locking said band against rotative displacement comprising a rotatable member journalled in said wheel and adapted to actuate said band, a spindle slidably mounted in said member and having a portion adapted to engage the material of said rim supporting means when it is desired to lock said band against displacement and to be freed from such engagement when it is desired to move said band, said spindle being feathered to said member when in the first mentioned position.

4. A wheel having a felloe provided with upstanding sides adapted to support a demountable rim, a plurality of brackets in said felloe, levers pivoted intermediate their length in said brackets, a peripheral band provided with a rack and having a plurality of cam faces adapted to engage one end of said levers when moved in one direction, springs for urging said levers in a direction opposite to the movement produced by said cam faces, a pinion journalled in the upstanding sides of said felloe and engaging the rack on said band, a reciprocally mounted spindle in said pinion and having a flat sided head engaging the rim-supporting portion of one of the sides of said felloe when said spindle is in innermost position, said head being adapted to be moved out of engagement with said side to permit of the rotation of said pinion, and a demountable rim having a circumferential flange adapted to be engaged by the other end of said levers when impinged by the cam faces on said peripheral band.

CLAYTON STUART WATKINS.